(12) United States Patent
Keohane et al.

(10) Patent No.: US 9,251,476 B2
(45) Date of Patent: Feb. 2, 2016

(54) MANAGING CALENDAR CONFLICTS

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1986 days.

(21) Appl. No.: 11/759,978

(22) Filed: Jun. 8, 2007

(65) Prior Publication Data
US 2008/0306997 A1    Dec. 11, 2008

(51) Int. Cl.
*G06F 3/048* (2013.01)
*G06Q 10/00* (2012.01)
*G06F 3/0482* (2013.01)

(52) U.S. Cl.
CPC .............. *G06Q 10/00* (2013.01); *G06F 3/0482* (2013.01)

(58) Field of Classification Search
USPC ................................................. 715/764, 963
See application file for complete search history.

(56) References Cited

U.S. PATENT DOCUMENTS

| | | | |
|---|---|---|---|
| 5,528,745 A | 6/1996 | King et al. | |
| 6,049,776 A | 4/2000 | Donnelly et al. | |
| 6,571,281 B1 | 5/2003 | Nickerson | |
| 7,082,402 B2 | 7/2006 | Conmy et al. | |
| 7,198,173 B2 | 4/2007 | Simon | |
| 7,222,156 B2 * | 5/2007 | Gupta et al. | 709/206 |
| 2004/0088362 A1 * | 5/2004 | Curbow et al. | 709/207 |
| 2004/0099362 A1 | 5/2004 | Martin et al. | |
| 2005/0216842 A1 | 9/2005 | Keohane et al. | |
| 2006/0015386 A1 * | 1/2006 | Moore | 705/8 |
| 2006/0053340 A1 | 3/2006 | Hite et al. | |
| 2006/0095859 A1 * | 5/2006 | Bocking et al. | 715/764 |
| 2007/0260503 A1 * | 11/2007 | Pan et al. | 705/9 |

OTHER PUBLICATIONS

"PracticeMaster Version 14 Manual" Software Technology, Inc., Microsoft Corporation, 2006, Chapters 5 & 6, pp. 67-97. http//:www.PracticeMaster.com.

* cited by examiner

*Primary Examiner* — Anil N Kumar
(74) *Attorney, Agent, or Firm* — Yee & Associates, P.C.; Steven L. Bennett

(57) ABSTRACT

A computer implemented method, apparatus, and computer usable program code for managing calendar conflicts. A plurality of calendar invitations waiting to be processed is identified to form a plurality of unprocessed calendar invitations. Calendar invitations are grouped within the plurality of unprocessed calendar invitations together that conflict with each other to form a group of conflicting calendar invitations. Each conflicting calendar invitation in the group of conflicting calendar invitations is presented in association with other calendar invitations in the group for resolution.

20 Claims, 4 Drawing Sheets

MANAGING CALENDAR CONFLICTS

BACKGROUND OF THE INVENTION

1. Field of the Invention

The present invention relates generally to an improved data processing system and in particular to a method and apparatus for managing events or appointments in a data processing system. Still more particularly, the present invention relates to a computer implemented method, apparatus, and computer usable program code for managing conflicts in a calendar.

2. Description of the Related Art

Electronic calendars are commonly used to record events and appointments. Electronic calendars act like date books and provide features, such as automatic entries for regular events and signaling of upcoming events. Further, electronic calendars also allow user's to send calendar invitations to events or appointments to other users. If other users accept the calendar invitations, the particular appointment is scheduled in both of the users' calendars. Electronic calendar usage has become quite sophisticated. Calendars may be provided as stand-alone programs or applications. Calendars often are provided as part of a personal productivity application, such as Lotus Notes® and Microsoft Outlook. Lotus Notes® is a product of International Business Machines Corporation. Additionally, Lotus Notes® is a registered trademark. Microsoft Outlook is a product from Microsoft Corporation.

With the scheduling of events, conflicts may occur when a user attempts to accept a calendar invitation to a new event, which has a conflicting time with an event that has already been scheduled and placed in the user's calendar. These and other calendar programs provide an ability to handle or resolve these types of meeting conflicts.

These types of tools, however, do not provide the user an ability to easily handle and resolve conflicts between multiple calendar invitations. Currently, a user may receive multiple calendar invitations for different events scheduled at the same time. These events are displayed to the user for processing. The user may accept one calendar invitation with that calendar invitation becoming scheduled in a calendar. Then, the user may desire to accept another calendar invitation, which overlaps or conflicts with the time for the first event that has already been scheduled. In such situation, the acceptance of the first calendar invitation has resulted in a reply already being sent to the sender of the first calendar invitation. In this case, the user must then request a change in the meeting time if the user decides that the second calendar invitation has a higher priority than the first one that has already been accepted.

For example, the first calendar invitation may be for a social event, while the second calendar invitation is for a required company meeting. In this case, the user has to send a request to the sender of the first calendar invitation to decline or suggest a different meeting time. When only a few calendar invitations, such as three or four, are present, the user may look at all of the calendar invitations and identify conflicts between the calendar invitations before accepting any of them. This solution becomes more difficult to use when numerous calendar invitations are present. As an example, if the user has 25 calendar invitations that have not been processed, the user has to review and identify conflicts between different events for all of the calendar invitations that have not yet been processed by the user.

Therefore, it would be advantageous to have an improved computer implemented method, apparatus, and computer usable program code for managing conflicts between calendar invitations for events in an electronic calendar.

SUMMARY OF THE INVENTION

The illustrative embodiments provide a computer implemented method, apparatus, and computer usable program code for managing calendar conflicts. A plurality of calendar invitations waiting to be processed is identified to form a plurality of unprocessed calendar invitations. Calendar invitations are grouped within the plurality of unprocessed calendar invitations together that conflict with each other to form a group of conflicting calendar invitations. Each conflicting calendar invitation in the group of conflicting calendar invitations is presented in association with other calendar invitations in the group for resolution.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
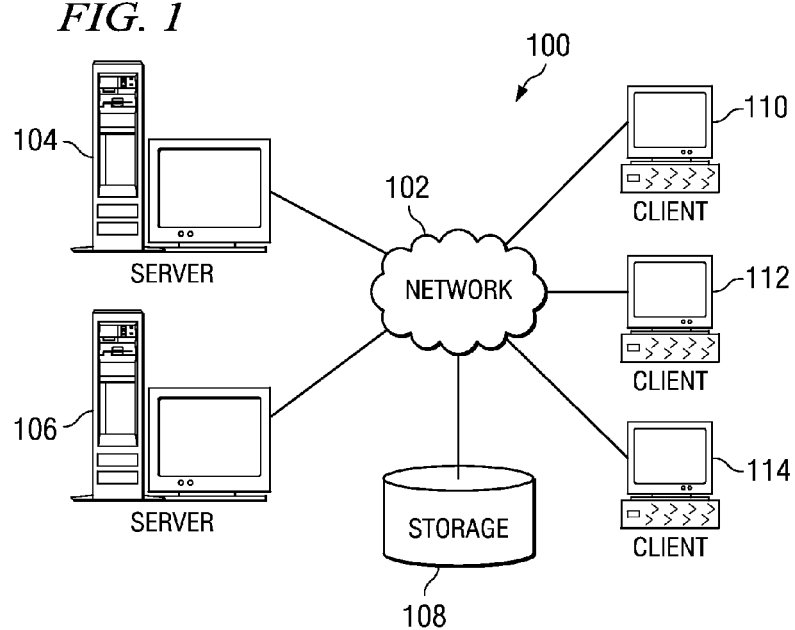
FIG. 1 is a pictorial representation of a network of data processing systems in which illustrative embodiments may be implemented.
Figure 2:
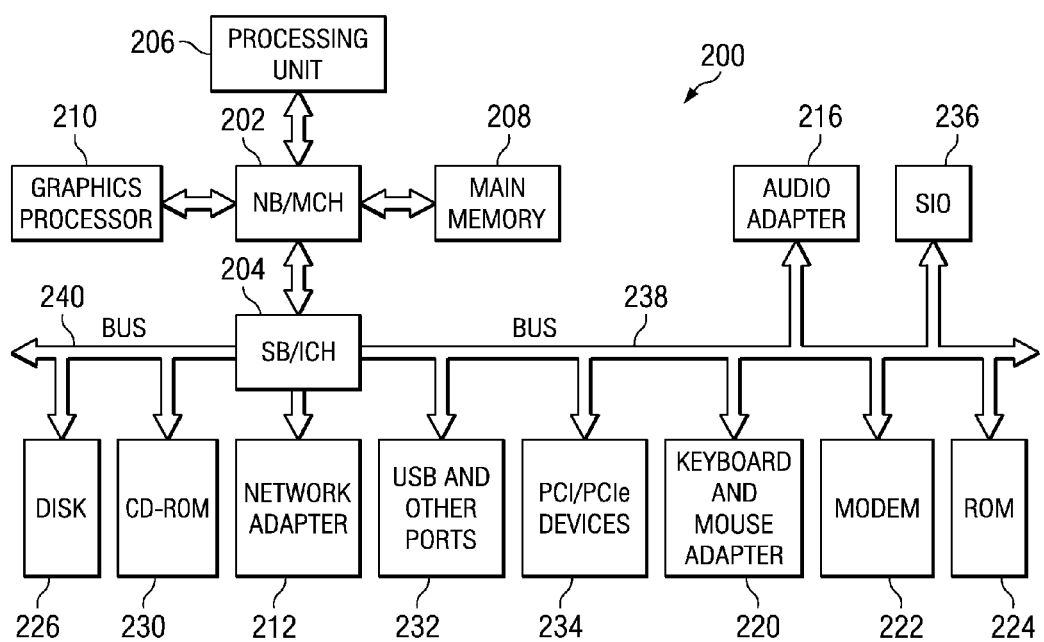
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In particular in these examples, clients 110, 112, and 114 may include calendars in which data for these calendars may be stored on server 104. Further, server 104 also may provide different scheduling processes for events in these calendars. Alternatively, depending on the implementation, calendar information may be stored at clients 110, 112, and 114. With this type of implementation, server 104 providing services to allow the clients 110, 112, and 114 to exchange calendar invitations and other information for the calendars. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™ based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different illustrative embodiments recognize that the current system of handling calendar invitations for events to be scheduled in the calendar are presented most commonly using the time and date at which each of the calendar invitations has been received. These calendar invitations also may be presented based on the sender of the calendar invitation. The different illustrative embodiments recognize that these types of views, however, do not provide a user an ability to easily group reviewed calendar invitations that have conflicting meeting times. In these illustrative examples, a conflicting meeting time between two calendar invitations are meeting times that occur at the same exact times or have some overlap during the times.

Thus, the different illustrative embodiments provide a computer implemented method, apparatus, and computer usable program code for managing calendar conflicts. Calendar invitations waiting to be processed are identified to form unprocessed calendar invitations. Calendar invitations that conflict with each other are grouped to form a group of conflicting calendar invitations. Each conflicting calendar invitation in the group of conflicting calendar invitations are presented in association with each other.

Figure 3:
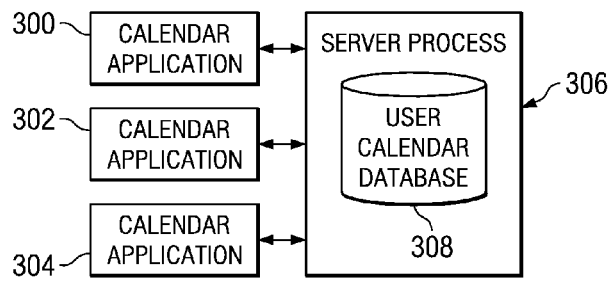
FIG. 3 is a diagram illustrating components used in managing calendar conflicts in accordance with an illustrative embodiment of the present invention.

Turning now to FIG. 3, a diagram illustrating components used in managing calendar conflicts is depicted in accordance with an illustrative embodiment. In this example, calendar application 300, calendar application 302 and calendar application 304 are client applications to server process 306. These calendar applications may be, for example, a stand-alone application providing calendar functions. Alternatively, these calendar applications may be processes or applications integrated within another application or program.

For example, calendar applications 300, 302, and 304 may be implemented using Microsoft Outlook. These applications also may be implemented using Lotus Notes®. In yet another implementation, these applications may be web-based applications. When implemented using existing applications, calendar applications 300, 302, and 304 may be modified to include processes to manage calendar conflicts for calendar invitations not yet processed by a user. In other implementations, these processes may be located on a server.

Depending on the particular implementation, calendar entries may be stored at the data processing system on which these calendar applications execute. In other implementations, the calendars for user's may be stored in a database, such as user calendar database 308. When calendar applications 300, 302, and 304 store entries locally, server process 306 only serves to facilitate the exchange of calendar invitations for appointments. In this type of implementation, server process 306 may be an email server process.

In these illustrative embodiments, a user of calendar application 300 may receive calendar invitations for events from other users at calendar applications 302 and 304. These calendar invitations are stored in a queue for processing by the user. The different illustrative embodiments provide a mechanism or process to logically group calendar conflicts to facilitate user handling prior to any of the calendar invitations being accepted on a user's calendar.

Figure 4:
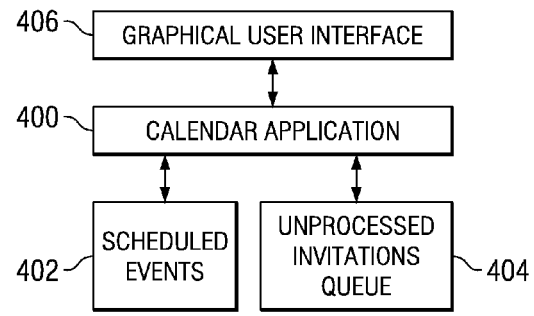
FIG. 4 is a block diagram of a calendar system in accordance with an illustrative embodiment.

Turning now to FIG. 4, a block diagram of a calendar system is depicted in accordance with an illustrative embodiment. Calendar application 400 is an example of a calendar application, such as calendar applications 300, 302, or 304 in FIG. 3. In this example, calendar application 400 may access entries for events or appointments already on a calendar for a user and scheduled events 402.

Calendar invitations that have not yet been accepted are located in unprocessed invitations queue 404. In these illustrative embodiments, calendar application 400 includes a process that allows for conflicts between calendar invitations and unprocessed invitations queue 404 to be grouped for easier handling. In these illustrative embodiments, the conflicting calendar invitations in the grouping of conflicting calendar invitations are presented in association with each other. The association may be made by presenting all of the conflicting calendar invitations together. These groupings may be presented to a user through graphical user interface 406 in these examples.

In addition, in presenting these conflicting calendar invitations in the group, graphical indicators may be associated with the conflicting calendar invitations to allow for easy identification of these conflicting calendar invitations. For example, the different calendar invitations in the grouping may be displayed together in a color to allow the user to easily identify the different calendar invitations that have conflicts. Alternatively, an icon, a different font size, a different font type, bolding, or some other graphical indicator may be associated with these conflicting calendar invitations.

If multiple groups of conflicting calendar invitations are present, a different graphical indicator may be used for each different group to provide for an easier identification of these conflicting calendar invitations. Further, groupings may be presented as a sub-window in graphical user interface 406.

In this manner, the different illustrative embodiments may help prevent the user from accepting a calendar invitation then having to decline the calendar invitation if another event is present that they would prefer or need to attend. These different illustrative examples prevent confusion and cascading impacts to other invitee calendars by avoiding the situation when a calendar invitation is accepted and then later declined.

Figure 5:
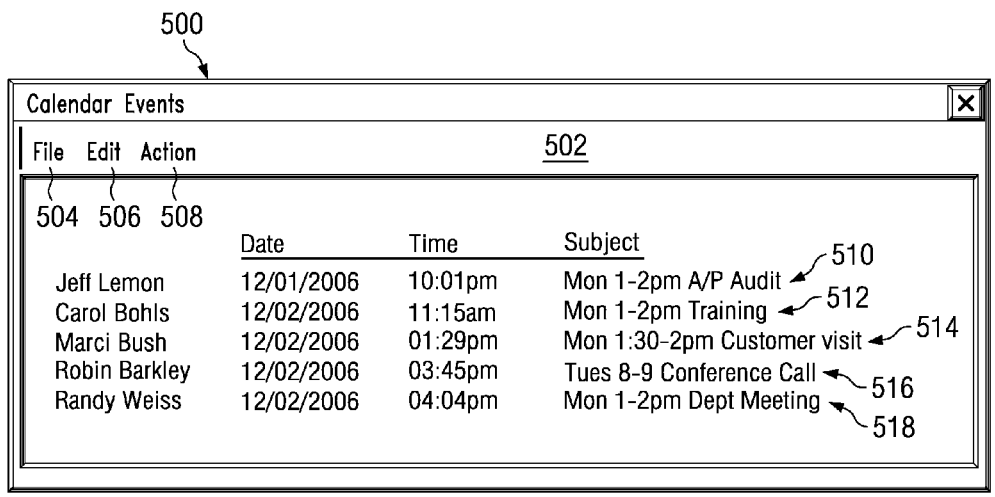
FIG. 5 is a diagram illustrating a graphical user interface for managing unprocessed calendar invitations in accordance with an illustrative embodiment.

With reference now to FIG. 5, a diagram illustrating a graphical user interface for managing unprocessed calendar invitations is depicted in accordance with an illustrative embodiment. In this example, window 500 is an example of a window that may be presented by a graphical user interface, such as graphical user interface 406 in FIG. 4. As depicted, window 500 displays calendar invitations 510, 512, 514, 516, and 518. These calendar invitations are for unprocessed calendar events. These calendar invitations may be located in a queue, such as unprocessed invitations queue 404 in FIG. 4.

In this example, the order of the calendar invitations is based on time and date. The time and date may be the time and date at which the invitations were sent or received depending on the particular implementation. In these examples, each calendar invitation includes a sender, a date sent, a time sent, and a subject line. Although, in these examples, the subject line includes a time and date for the event, in some cases this information is not displayed.

Window 500 also contains menu bar 502. This menu bar provides for menus of commands that may be performed. In this example, menu bar 502 contains file menu 504, edit menu 506, and action menu 508.

In these illustrative examples, a process may be initiated to identify and group calendar invitations within calendar invitations 510, 512, 514, 516, and 518 that have conflicting times with other calendar invitations. This process may be initiated in a number of different ways depending on the implementation.

Figure 6:
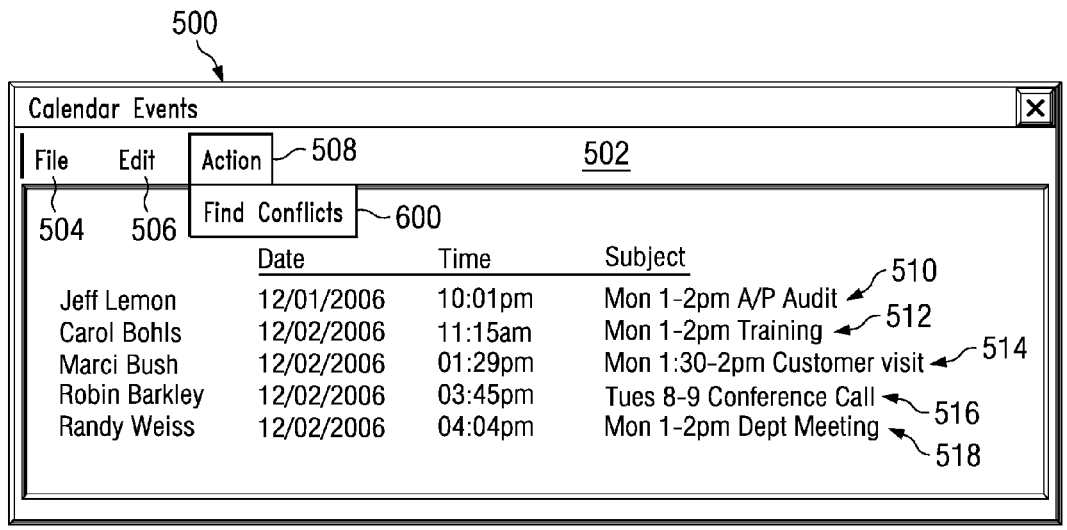
FIG. 6 is a diagram illustrating a window in which calendar conflicts may be managed in accordance with an illustrative embodiment.

Turning now to FIG. 6, a diagram illustrating a window in which calendar conflicts may be managed is depicted in accordance with an illustrative embodiment. In this example, action menu 508 contains find conflicts 600. Selecting this command from action menu 508 initiates a process for identifying and presenting calendar invitations having conflicting times. This command is only one example of how the different processes in the illustrative embodiments may be initiated. Other mechanisms may be used, such as function keys, a menu presented through a right-click of a mouse button, or a default option to initiate the process.

Figure 7:
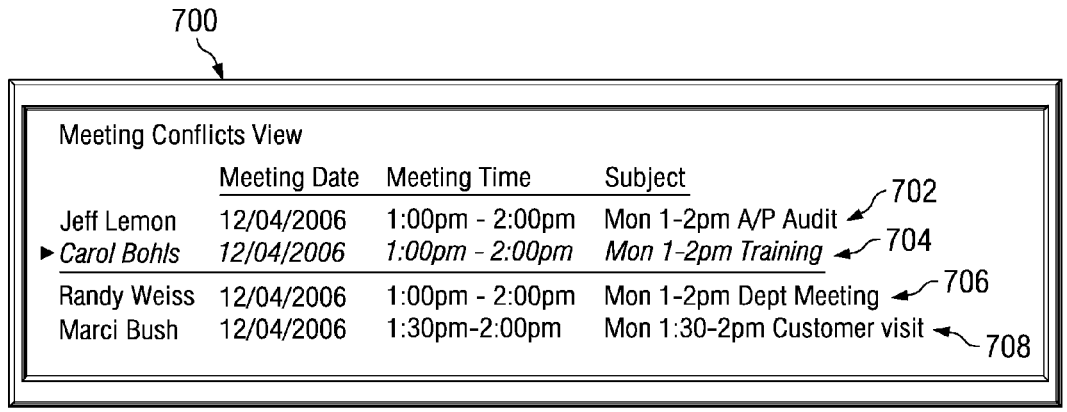
FIG. 7 is a sub window containing conflicting calendar invitations is depicted in accordance with an illustrative embodiment.

With reference now to FIG. 7, a sub window containing conflicting calendar invitations is depicted in accordance with an illustrative embodiment. In FIG. 7, the different conflicting calendar invitations are presented in association with each other through the use of sub window 700. Sub window 700 presents a meeting conflicts view and is an example of a sub window that may be presented when find conflicts 600 is selected from action menu 508 in FIG. 6. In this particular example, sub window 700 presents a group of calendar invitations that have conflicting meeting times.

As depicted, calendar invitations 702, 704, 706, and 708 are ones that conflict with each other. In these examples, calendar invitations 702, 704, 706, and 708 correspond to calendar invitations 510, 512, 518, and 514, respectively, in FIG. 6. As depicted, calendar invitations 702, 704, 706, and 708 are in sub window 700. These calendar invitations are presented with duration of the events that are identified from the start and end times for each event. The user may select a particular calendar invitation to attend. In this particular example, the user has selected event 704. As a result, this calendar invitation is accepted and placed on the user's calendar. The user may then be prompted to decline or delegate calendar invitations 702, 706, and 708.

Figure 8:
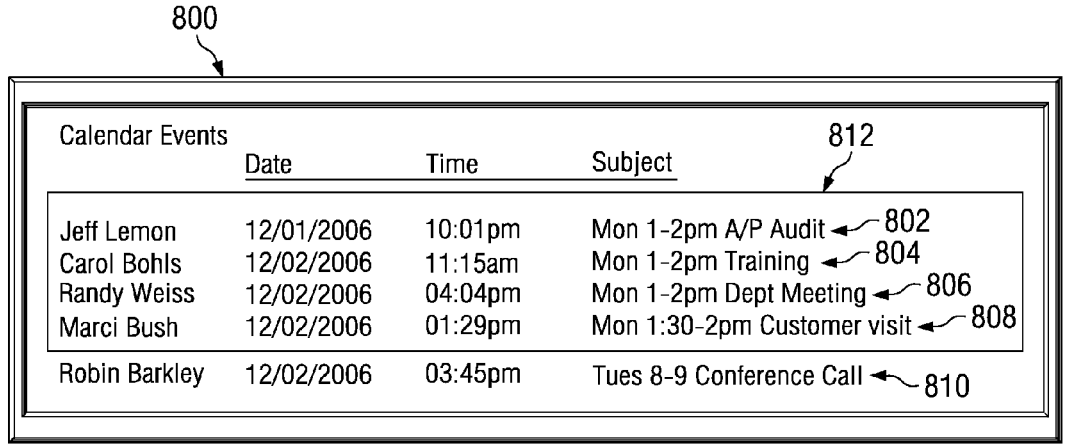
FIG. 8 is a graphical user interface for managing meeting conflicts in accordance with an illustrative embodiment.

Turning now to FIG. 8, a graphical user interface for managing meeting conflicts is depicted in accordance with an illustrative embodiment. In this example, window 800 illustrates an alternative implementation when a user pre-configures an option or selects a find conflicts action to always group calendar invitations that conflict with each other. In this type of implementation, a sub window is unnecessary because the different conflicting calendar invitations are presented in association with each other through the use of a graphical indicator rather than the use of a sub window.

In this example, calendar invitations 802, 804, 806, and 808 are conflicting calendar invitations. Calendar invitation 810 does not conflict with the other calendar invitations presented within window 800. In this example, box 812 is used to present the conflicting calendar invitations in association with each other.

Alternatively, other graphical indicators may be used to identify conflicting calendar invitations. For example, the area within box 812 may be presented using a different color than the rest of window 800. Graphical indicators may be associated with calendar invitations 802, 804, 806, and 808. The text for these calendar invitations may be presented using a different font type, a font color, a font size, or some other graphical indicator, such as an icon, not used for other calendar invitations.

Figure 9:
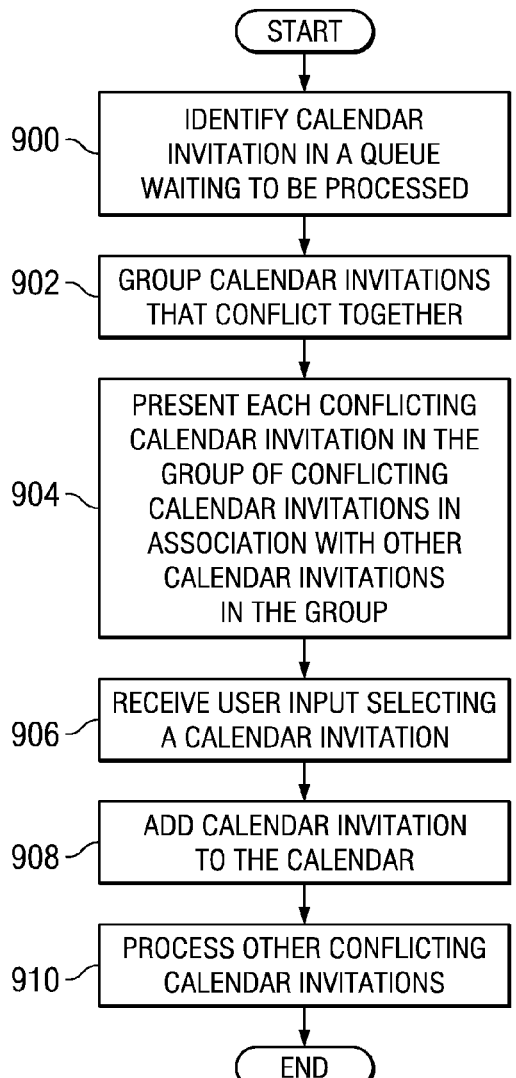
FIG. 9 is a flowchart of a process for managing calendar conflicts in accordance with an illustrative embodiment.

With reference now to FIG. 9, a flowchart of a process for managing calendar conflicts is depicted in accordance with an illustrative embodiment. The process illustrated in FIG. 9 may be implemented in an application, such as calendar application 400 in FIG. 4.

The process begins by identifying calendar invitations in a queue that are waiting to be processed (step 900). Thereafter, calendar invitations that conflict with each other are grouped together (step 902).

Next, each conflicting calendar invitation in the group of conflicting calendar invitations is presented in association with other calendar invitations in the group (step 904). In step 904, if a single conflicting group is present, all of those calendar invitations may be presented in a number of different ways. For example, a sub window such as sub window 700 in FIG. 7 may be used.

Alternatively, the calendar invitations may be grouped in the same window with other calendar invitations that are not conflicting. In this type of implementation, the conflicting calendar invitations in a group are identified using a graphical indicator.

Additionally, in some cases, more than one group of conflicting calendar invitations may be present. In this case, the different groupings may be presented through the use of different graphical indicators to identify those different groupings. Further, a separate sub window may be used to identify each grouping depending on the implementation. In any event, the different groupings of conflicting calendar invitations are presented in the graphical user interface in association with other calendar invitations in the group using the different processes of the illustrative embodiments.

Thereafter, user input is received selecting a calendar invitation from the group of conflicting calendar invitations (step 906). Then, the selected calendar invitation is added to the calendar for the user (step 908). Next, the other conflicting calendar invitations are processed (step 910) with the processes terminating thereafter. In step 910, the user may be directed to decline or delegate the other conflicting calendar invitations that were not selected in the group of conflicting calendar invitations.

Figure 10:
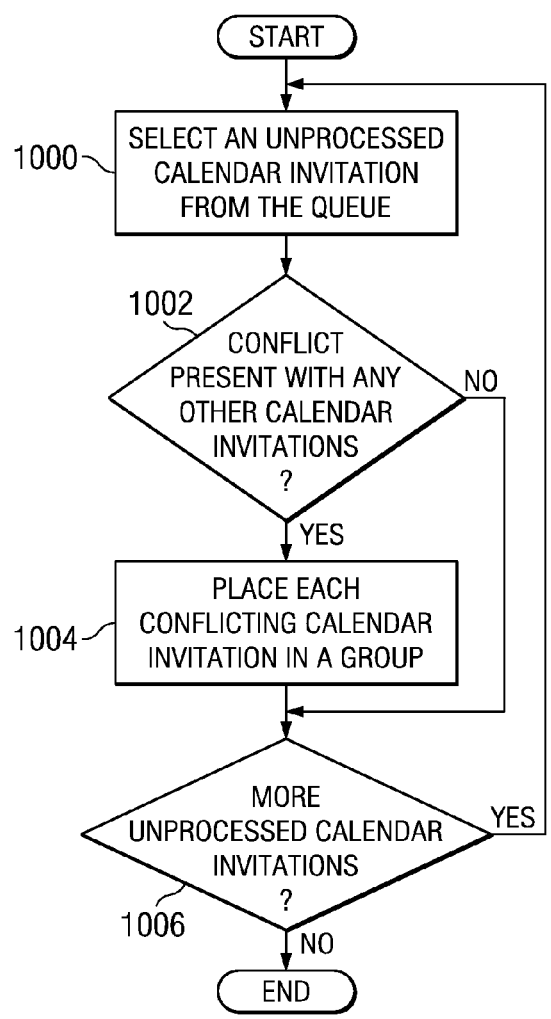
FIG. 10 is a flowchart of a process for grouping conflicting calendar invitations in accordance with an illustrative embodiment.

Turning now to FIG. 10, a flowchart of a process for grouping conflicting calendar invitations is depicted in accordance with an illustrative embodiment. The process illustrated in FIG. 10 is a more detailed description of step 902 in FIG. 9.

The process begins by selecting an unprocessed calendar invitation from the queue (step 1000). In this example, the queue is a calendar invitation queue, such as unprocessed invitations queue 404 in FIG. 4. Thereafter, a determination is made as to whether a conflict is present with any other calendar invitations in the queue (step 1002). In step 1002 a conflict may be present with one or more other calendar invitations. If a conflict if found, each conflicting calendar invitation conflicting with the selected calendar invitation is placed into a group (step 1004).

Then, a determination is made as to whether additional unprocessed calendar invitations are present in the queue (step 1006). Unprocessed calendar invitations are those that have not yet been selected for comparison with other calendar invitations as well as any calendar invitations that have not been placed into a group. If additional unprocessed calendar invitations are present, the process returns to step 1000 to select another unprocessed calendar invitation from the queue for processing. Otherwise the process terminates. With reference again to step 1002, if a conflict is not present with any other calendar invitations in the queue, the process proceed to step 1006 as described above.

Thus, the different illustrative embodiments provide a computer implemented method, apparatus, and computer usable program code for managing calendar conflicts. Calendar invitations waiting to be processed are identified to form unprocessed calendar invitations. Calendar invitations are grouped together that conflict with each other to form a group of conflicting calendar invitations. Each conflicting calendar invitation in the group of conflicting calendar invitations are presented in association with each other.

In this manner, the different illustrative embodiments group calendar conflicts between different calendar invitations to facilitate easier handling of those calendar invitations prior to being accepted on a user's calendar. This processing occurs for calendar invitations that are still waiting to be processed. In other words, the grouping of calendar invitations and identification of conflicts is performed prior to these calendar invitations being accepted and placed on to the user's calendar.

Consequently, the different illustrative embodiments prevent a user from accepting a calendar invitation and then declining that calendar invitation if another calendar invitation is found that the user would prefer to accept. These depicted embodiments prevent the confusion and cascading impacts on other invitee calendars when a calendar invitation is accepted and then later declined.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing calendar conflicts, the computer implemented method comprising:

identifying a plurality of calendar invitations waiting to be processed to form a plurality of unprocessed calendar invitations, wherein each of the plurality of unprocessed calendar invitations has not been accepted and has not been scheduled for a calendar;

grouping unprocessed calendar invitations within the plurality of unprocessed calendar invitations together that conflict with each other to form a group of unprocessed conflicting calendar invitations; and presenting each unprocessed conflicting calendar invitation in the group of unprocessed conflicting calendar invitations in association with other unprocessed conflicting calendar invitations in the group.

2. The computer implemented method of claim 1, wherein the presenting step comprises:

displaying all of the unprocessed conflicting calendar invitations in the group of unprocessed conflicting calendar invitations together.

3. The computer implemented method of claim 2, wherein all of the unprocessed conflicting calendar invitations in the group of unprocessed conflicting calendar invitations are displayed in a window.

4. The computer implemented method of claim 1, wherein the presenting step comprises:

displaying each unprocessed conflicting calendar invitation in the group of unprocessed conflicting calendar invitations in association with a graphical indicator.

5. The computer implemented method of claim 4, wherein the graphical indicator is at least one of a color, an icon, a font type, and a font size.

6. The computer implemented method of claim 1 further comprising:

responsive to presenting each unprocessed conflicting calendar invitation in the group of unprocessed conflicting calendar invitations in association with other unprocessed conflicting calendar invitations in the group, receiving a user input from a user selecting an unprocessed conflicting calendar invitation from the group of unprocessed conflicting calendar invitations to form a selected unprocessed conflicting calendar invitation; and adding the selected unprocessed conflicting calendar invitation to the calendar for the user.

7. The computer implemented method of claim 1, wherein the grouping step comprises:

identifying each unprocessed calendar invitation in the plurality of unprocessed calendar invitations having a time that conflicts or overlaps with a time for another unprocessed calendar invitation in the plurality of unprocessed calendar invitations.

8. The computer implemented method of claim 1, wherein the grouping and presenting steps are initiated in response to a user input.

9. A computer program product comprising:

a computer usable storage device having computer usable program code stored thereon for managing calendar conflicts, the computer program product comprising:

computer usable program code for identifying a plurality of calendar invitations waiting to be processed to form a plurality of unprocessed calendar invitations, wherein each of the plurality of unprocessed calendar invitations has not been accepted and has not been scheduled for a calendar;

computer usable program code for grouping unprocessed calendar invitations within the plurality of unprocessed calendar invitations together that conflict with each other to form a group of unprocessed conflicting calendar invitations; and computer usable program code for presenting each unprocessed conflicting calendar invitation in the group of unprocessed conflicting calendar invitations in association with other unprocessed conflicting calendar invitations in the group.

10. The computer program product of claim 9, wherein the computer usable program code for presenting each unprocessed conflicting calendar invitation in the group of unprocessed conflicting calendar invitations in association with other unprocessed conflicting calendar invitations in the group comprises:

computer usable program code for displaying all of the unprocessed conflicting calendar invitations in the group of unprocessed conflicting calendar invitations together.

11. The computer program product of claim 10, wherein all of the unprocessed conflicting calendar invitations in the group of unprocessed conflicting calendar invitations are displayed in a window.

12. The computer program product of claim 9, wherein the computer usable program code for presenting each unprocessed conflicting calendar invitation in the group of unprocessed conflicting calendar invitations in association with other unprocessed conflicting calendar invitations in the group comprises:

computer usable program code for displaying each unprocessed conflicting calendar invitation in the group of unprocessed conflicting calendar invitations in association with a graphical indicator.

13. The computer program product of claim 12, wherein the graphical indicator is at least one of a color, an icon, a font type, and a font size.

14. The computer program product of claim 9 further comprising:

computer usable program code, responsive to presenting each unprocessed conflicting calendar invitation in the group of unprocessed conflicting calendar invitations in association with each other, for receiving a user input from a user selecting an unprocessed conflicting calendar invitation from the group of unprocessed conflicting calendar invitations to form a selected unprocessed conflicting calendar invitation;

computer usable program code for adding the selected unprocessed conflicting calendar invitation to the calendar for the user.

15. The computer program product of claim 9, wherein the computer usable program code for grouping unprocessed calendar invitations within the plurality of unprocessed calendar invitations together that conflict with each other to form a group of unprocessed conflicting calendar invitations comprises:

computer usable program code for identifying each unprocessed calendar invitation in plurality of unprocessed calendar invitations having a time that conflicts or overlaps with a time for another unprocessed calendar invitation in the plurality of unprocessed calendar invitations.

16. The computer program product of claim 9, wherein the computer usable program code for grouping unprocessed calendar invitations within the plurality of unprocessed calendar invitations together that conflict with each other to form a group of unprocessed conflicting calendar invitations and computer usable program code for presenting each unprocessed conflicting calendar invitation in the group of unprocessed conflicting calendar invitations in association with each other are initiated in response to a user input.

17. A data processing system comprising:

a bus;

a communications unit connected to the bus;

a storage device connected to the bus, wherein the storage device includes computer usable program code; and a processor unit connected to the bus, wherein the processor unit executes the computer usable program code to identify a plurality of calendar invitations waiting to be processed to form a plurality of unprocessed calendar invitations, wherein each of the plurality of unprocessed calendar invitations has not been accepted and has not been scheduled for a calendar; group unprocessed calendar invitations within the plurality of unprocessed calendar invitations together that conflict with each other to form a group of unprocessed conflicting calendar invitations; and present each unprocessed conflicting calendar invitation in the group of unprocessed conflicting calendar invitations in association with other unprocessed conflicting calendar invitations in the group.

18. The data processing system of claim 17, wherein in executing the computer usable program code to present each unprocessed conflicting calendar invitation in the group of unprocessed conflicting calendar invitations in association with other unprocessed conflicting calendar invitations in the group, the processor further executes the computer usable program code to display all of the unprocessed conflicting calendar invitations in the group of unprocessed conflicting calendar invitations together.

19. The data processing system of claim 18, wherein all of the unprocessed conflicting calendar invitations in the group of unprocessed conflicting calendar invitations are displayed in a window.

20. The data processing system of claim 17, wherein in executing the computer usable program code to present each unprocessed conflicting calendar invitation in the group of unprocessed conflicting calendar invitations in association with other unprocessed conflicting calendar invitations in the group, the processor further executes the computer usable program code to display each unprocessed conflicting calendar invitation in the group of unprocessed conflicting calendar invitations in association with a graphical indicator.

\* \* \* \* \*